(12) United States Patent
Kalajan

(10) Patent No.: US 6,202,156 B1
(45) Date of Patent: *Mar. 13, 2001

(54) REMOTE ACCESS-CONTROLLED COMMUNICATION

(75) Inventor: Kevin E. Kalajan, Redwood City, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/928,360

(22) Filed: Sep. 12, 1997

(51) Int. Cl.$^7$ ............................ G06F 11/30; G06F 15/173
(52) U.S. Cl. ........................ 713/201; 713/202; 709/225; 709/229
(58) Field of Search ................ 395/187.01, 200.57, 395/200.59, 200.55; 370/352, 389; 713/201, 202, 200; 709/225, 227, 229

(56) References Cited

U.S. PATENT DOCUMENTS

| | | | |
|---|---|---|---|
| 5,560,008 | * | 9/1996 | Johnson et al. .................... 395/650 |
| 5,684,951 | * | 11/1997 | Goldman et al. ............... 395/188.01 |
| 5,774,650 | * | 6/1998 | Chapman et al. ................ 395/186 |
| 5,778,174 | * | 7/1998 | Cain .................................. 395/187.01 |
| 5,781,550 | * | 7/1998 | Templin et al. ..................... 370/401 |
| 5,805,803 | * | 9/1998 | Birrell et al. ..................... 395/187.01 |
| 5,805,820 | * | 9/1998 | Bellovin et al. ................ 395/200.55 |
| 5,812,819 | * | 9/1998 | Rodwin et al. ...................... 395/500 |
| 5,815,664 | * | 9/1998 | Asano ................................. 395/200 |
| 5,822,518 | * | 10/1998 | Ooki et al. ...................... 395/187.01 |
| 5,825,890 | * | 10/1998 | Elgamal et al. ...................... 380/49 |
| 5,828,532 | * | 10/1998 | Holden et al. ................. 395/187.01 |
| 5,828,833 | * | 10/1998 | Belville et al. ................. 395/187.01 |
| 5,832,209 | * | 11/1998 | Krantz .............................. 395/182.1 |
| 5,832,228 | * | 11/1998 | Holden et al. .................. 395/200.55 |
| 5,835,726 | * | 11/1998 | Shwed et al. ................... 395/200.59 |

* cited by examiner

*Primary Examiner*—Norman M. Wright
(74) *Attorney, Agent, or Firm*—Hickman Palermo Truong & Becker LLP; Bobby K. Truong

(57) ABSTRACT

To establish an access-controlled communications path between a client and an access-controlled network resource, a determination is initially made as to whether the client is authorized to access the access-controlled resource. If the client is authorized to access the access-controlled resource, then a validated parameter associated with the client (e.g. the client's network address) is established. Thereafter, a firewall is configured to selectively accept future communications having the validated parameter associated therewith. Upon receiving a communication, a determination is made as to whether the communication has the validated parameter associated therewith. If it does (thereby indicating that the communication is from the authorized client), then the communication is allowed to pass through the firewall to the access-controlled network resource. In this manner, an access-controlled communications path is established between the client and the access-controlled network resource.

27 Claims, 3 Drawing Sheets

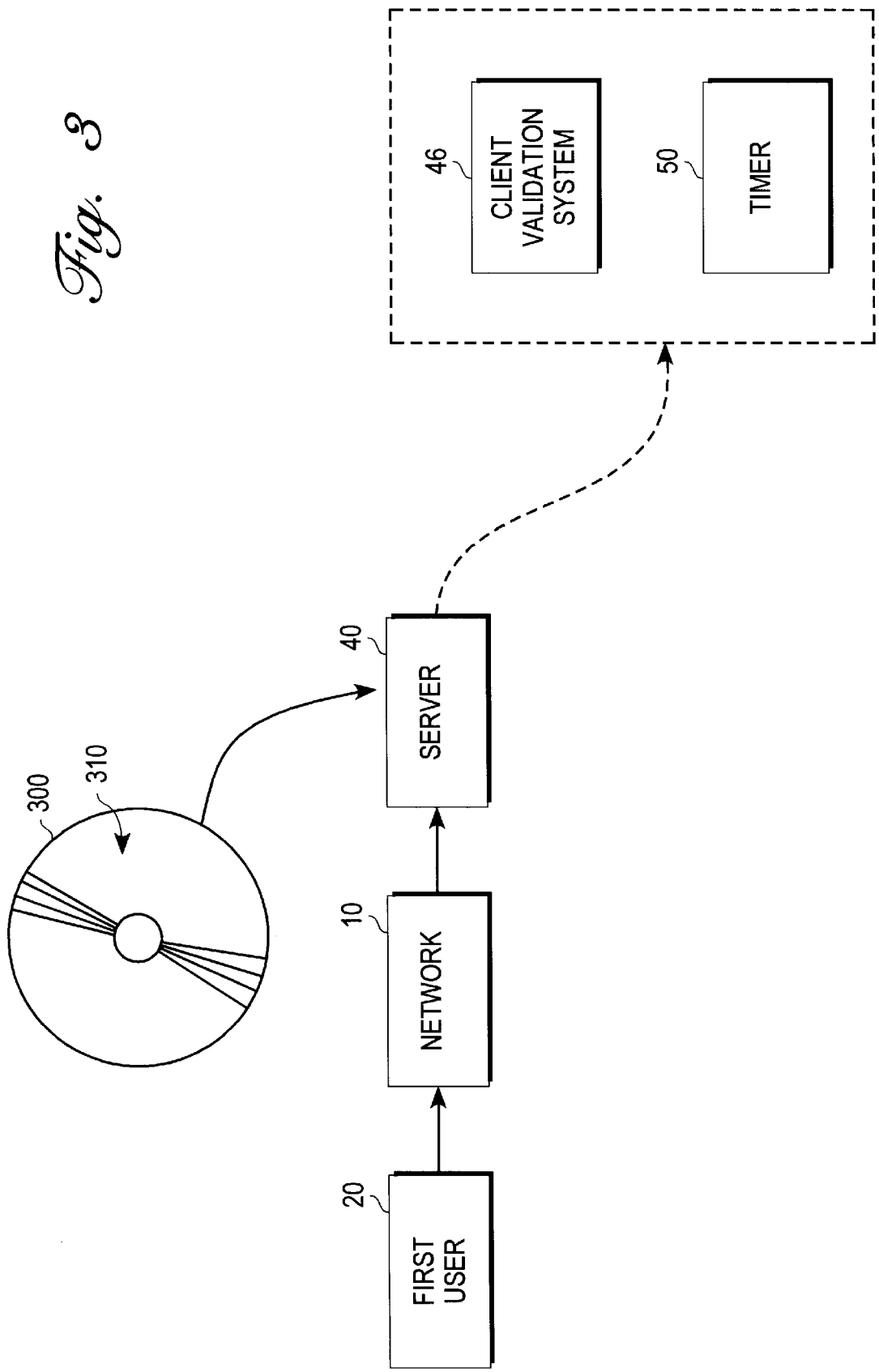

REMOTE ACCESS-CONTROLLED COMMUNICATION

BACKGROUND

The present invention relates generally to electronic communications.

Generally, when a client establishes an electronic communication path over a network with a server at a remote location the path may not be secure. That is, messages sent between client and server may be susceptible to interception or tampering. This is especially true in communications paths initiated over large networks such as the Internet. In such unsecured environments, transfer of confidential information can be risky.

As accessibility to the Internet from remote locations continues to become more widely available and convenient, utilizing the Internet to perform tasks such as remotely accessing electronic mail and databases becomes increasingly desirable. Some methods have been developed to allow a remote user to establish secure communications sessions. For example, a variety of encryption methods have been developed at several network levels, such as at the transport protocol level (with, e.g., HTTPS) and the application level (with, e.g., encryption of transported files). As another example, firewalls can prevent access to sensitive data from unauthorized Internet clients. Current one-time password schemes can be used to allow access to the resources of a web server or network. However, such schemes often allow public access to the authentication system, thus potentially leaving the system open to "hackers" or other potential intruders.

SUMMARY

In general, in one aspect, the invention features establishing an access-controlled communications path across a network between a client and a network resource, where the client has a client network address. The client is validated to produce a validated client network address, and the client is allowed access to the network resource based upon the validated client network address.

Embodiments of the invention may include one or more of the following features. A communications path can be established between the client and a destination network address coupled to the network resource. Access to the network resource can be allowed by configuring the network resource to selectively communicate with the validated client network address. Access to the network resource can be allowed by configuring the network resource to selectively accept packets from the validated client network address. The network resource can stop accepting packets from the client network address after the client terminates the access-controlled communications path, and can continue rejecting packets until the client network address is again validated. The network resource can block communication with at least one unvalidated network address. The network resource can drop packets from unvalidated network addresses. Access to the network resource can be allowed by opening a firewall to packets from the validated client network address. Establishing a communications path between the client and the destination network address can include establishing a communications path between the client and a server through the destination network address. The server can be an HTTP server. The client network address can be an Internet Protocol (IP) address. The access-controlled communications path can be terminated after a first predetermined time period, wherein information relating to the time period can be indicated to the client. The information can include the time remaining in the time period, and how to extend the time period. The access-controlled communications path can be maintained for a first predetermined time period, after which the client can be revalidated and the access-controlled communications path maintained for a second predetermined time period based upon the revalidation. Validating can include requesting a first predetermined validation sequence from the client, and validating the client based upon a response. A second predetermined validation sequence can be requested in order to maintain the access-controlled communications path once it has been established. A derivative client can be validated in addition to the client, where the derivative client shares the client network address with the client, where the client establishes a first predetermined time period for the access-controlled communications path and the derivative client establishes a second predetermined time period for the access-controlled communications path. The first predetermined time period can be compared with the second predetermined time period to determine a longer time period, and the access-controlled communications path can be maintained based on the longer time period.

In general, in another aspect, the invention features apparatus for establishing an access-controlled communications path across a network between a client coupled to the network and a server coupled to the network, where the client has a client network address and the server has a destination network address. The apparatus includes a port coupled to the server to receive packets addressed to the destination network address. A client validation system coupled to the port, upon validating the client, allows the client to access the server based upon the client network address.

Embodiments of the invention may include one or more of the following features. When the client validation system allows the client to access the server, the client validation system can configure the port to selectively communicate with the client network address. When the client validation system allows the client to access the server, the client validation system can configure the port to selectively accept packets from the client network address. The port can drop packets from unvalidated network addresses.

In general, in another aspect, the invention features apparatus for establishing an access-controlled communications path across a network between a client coupled to the network and a network resource, where the client has a client network address. The apparatus includes a publicly-accessible port coupled to the network to receive packets addressed to the apparatus. An access-controlled port coupled to the network resource requires validation for access. A firewall coupled to the publicly-accessible port and the access-controlled port blocks packets from unvalidated network addresses. A client validation system coupled to the publicly-accessible port and the firewall, upon validating the client, configures the firewall such that packets from the client are passed through the firewall to the access-controlled port based upon the client network address.

Embodiments of the invention may include one or more of the following features. A timer can be coupled to the client validation system and the firewall, wherein the timer configures the firewall, after the client has been validated, such that after a predetermined time period, packets from the client are no longer passed through the firewall to the access-controlled port until the client is revalidated.

In general, in another aspect, the invention features a storage device tangibly storing a control program, the control program, when coupled to a control device, operating the control device to establish an access-controlled communications path across a network between a client and a network resource, where the client has a client network address. The control program is configured to operate the control device to perform functions which include validating the client to produce a validated client network address, and allowing access to the network resource based upon the destination network address.

Advantages of the invention may include one or more of the following. Remote or traveling users can access and transmit confidential information via a network such as the Internet without compromising the confidentiality of the information. By accessing a specific HTTP web site and performing a validation routine, the user can achieve an access-controlled communications path from any remote location that can access the Internet. In such a system, "hackers" or other potential intruders will not be able to access the validation system for the access-controlled communications channel. The publicly-accessible portion can be a networked computer with little or no resources to be compromised. By allowing only validated network addresses contact with access-controlled resources, where additional verifications can be made, potential intruders can be better excluded from attempting access to those resources, greatly enhancing security.

These and other features and advantages of the present invention will become more apparent from the following description, drawings, and claims.

DRAWINGS

FIG. 3 is a block diagram of a machine-readable device encoded with software for establishing an access-controlled communications path on a server.

DESCRIPTION

Figure 1:
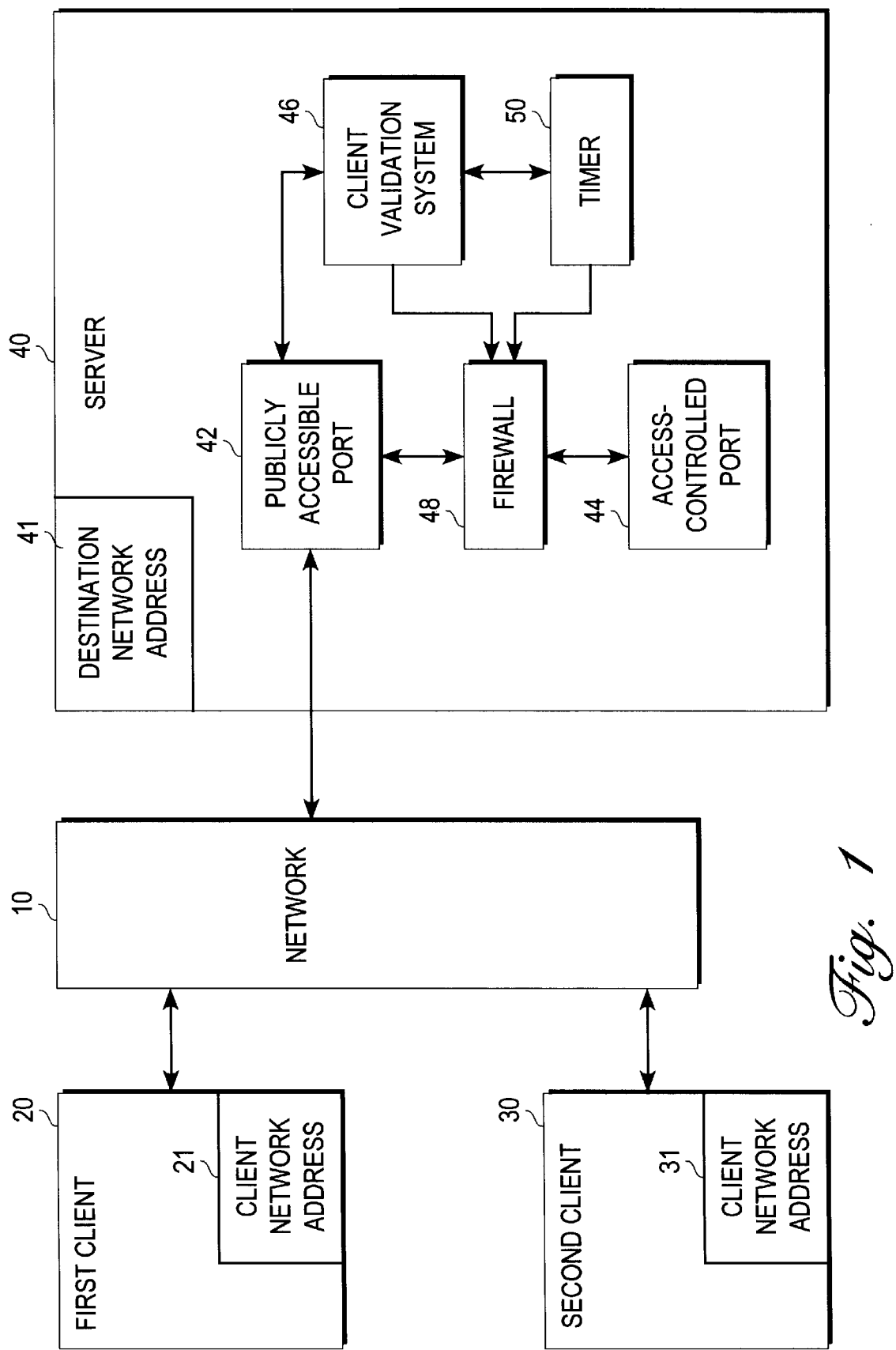
FIG. 1 is block diagram of a data communications network.

Referring to FIG. 1, network 10 is coupled to and allows data communication between first client 20, second client 30, and server 40. First client 20, second client 30, and server 40 all have unique network addresses that correspond to their connection to network 10. First client 20 has a client network address 21 which may be unique and which serves to identify first client 20 to other entities coupled to network 10. Client network address 21 may be an Internet protocol (IP) address. Similarly, server 40, which may be an HTTP server or another network resource, has destination network address 41 which serves to identify, and facilitate data exchange with, server 40. In one embodiment, server 40 supports an HTTP web site which can be accessed via the Internet. Server 40 includes publicly-accessible port 42, access-controlled port 44, client validation system 46, firewall 48, and timer 50.

First client 20 can access the web site supported by server 40 from any remote location that allows access to network 10, e.g., by connecting to an Internet provider via a modem. This initial access is via an unsecured communications path between first client 20 and publicly-accessible port 42.

Once a communications path has been established between first client 20 and publicly-accessible port 42, client validation system 46 validates first client 20 to determine whether first client 20 should be granted access to access-controlled port 44. Validation may be accomplished through a password system, with an electronic smart card that generates a known sequence of validation codes or sequences, or by using other validation techniques. One particular validation scheme uses a challenge table having a predetermined, enumerated list of validation code sequences. For example, the server may ask the client to enter a validation code sequence corresponding to number 82. The client would then respond by entering the validation code sequence corresponding to entry 82 of the challenge table. These validation code sequences can be intended for a single use only, thus ensuring that no other client can intercept the last-used validation code sequence and use it to gain unauthorized access.

Because validation takes place over an unsecured communications path, the validation system should be devised such that other clients are not able to intercept and then use components of the validation system to gain access to the access-controlled port 44. The use of one-time passwords fulfills this need, because, even if a one-time password is intercepted, it cannot be used again.

Once first client 20 is validated, first client 20 is granted access to an access-controlled network resource such as server 40 via an access-controlled communications path between first client 20 and access-controlled port 44. Client network address 21, corresponding to the now-validated first client 20, is considered a validated network address. Client validation system 46 establishes the access-controlled communications path by instructing firewall 48 to allow packets from first client 20 to pass through to access-controlled port 44.

During communications over the access-controlled communications path, firewall 48 allows only data packets from validated network addresses to pass through to access-controlled port 44. Each communications or data packet from a client typically includes information indicating the source network address of the packet. This information can be used to determine whether or not the server 40 will accept the packets or communicate with the source of incoming communications. Thus, if second client 30, having a different, unvalidated client network address, attempts to send packets to or communicate with access-controlled port 44, firewall 48 will refuse to pass packets to access-controlled port 44. Firewall 48 may drop packets received from second client 30 and from all other unvalidated clients. If firewall 48 drops packets from second client 30, second client 30 will not receive any information as to the disposition of the packets it attempted to send to access-controlled port 44. This is beneficial for security reasons, as it does not provide second client 30 with any information which second client 30 might exploit to gain access to secure information through access-controlled port 44.

After gaining access to access-controlled port 44, first client 20 may perform additional validation steps to gain access to the non-public information available on server 40. The additional validation steps may include another password system. The advantage of having this type of two-tiered validation system is that even if potential intruders discover access-controlled port 44, they will not be allowed to "hack" or experiment with it. Even so, although potential intruders can experiment with publicly-accessible port 42, they will be blocked by firewall 48 and therefore unable to obtain or affect information that must be accessed through access-controlled port 44.

Once the access-controlled communications path has been established, client validation system 46 can allow the path to be maintained for a predetermined period of time. The time period can be a standard time period, client specific, or set when first client 20 initiates the access-controlled communications path. If the path is to be maintained for a predetermined time period, client validation system 46 can instruct timer 50 to either terminate the access-controlled communications path at the end of the predetermined time period or allow first client 20 to be revalidated and thus maintain the access-controlled communications path.

To keep first client 20 apprised of the status of the access-controlled communications path, timer 50 can provide information to first client 20 about the predetermined time period. This information can also be supplied through client validation system 46. The information provided can include the amount of time remaining in the time period or information on extending the time period. For example, timer 50 may communicate a running clock to first client 20 via a dialog box or other indication of the time remaining before revalidation is required. The client, in turn, can use this information to generate an indicator that displays the information. When the first predetermined time period expires, timer 50 can then prompt first client 20 for an additional validation sequence which, when entered, causes timer 50 to maintain the access-controlled communications path for a second predetermined time period.

In some scenarios, multiple clients may share a single proxy server allowing them to access networks such as the Internet. In such cases, the multiple clients share the network address of the proxy server. Therefore, both a client and a derivative client may establish access-controlled communications paths with the same destination server 40, wherein each of the two access-controlled communications paths is established for a predetermined time period. Client validation system 46, after opening firewall 48 to packets from the shared network address, can compare the two predetermined time periods and determine which is longer. Based on the comparison, the longer time period will be used to determine when timer 50 closes firewall 48 to packets from the shared network address. This can also apply to any other case where a plurality of clients share the same network address. Because firewall 48 can remain open for the longest time period of any client which has been validated, ignoring the shorter time periods of other clients at the same network address reduces the overhead which must be managed by the system without altering performance.

Figure 2:
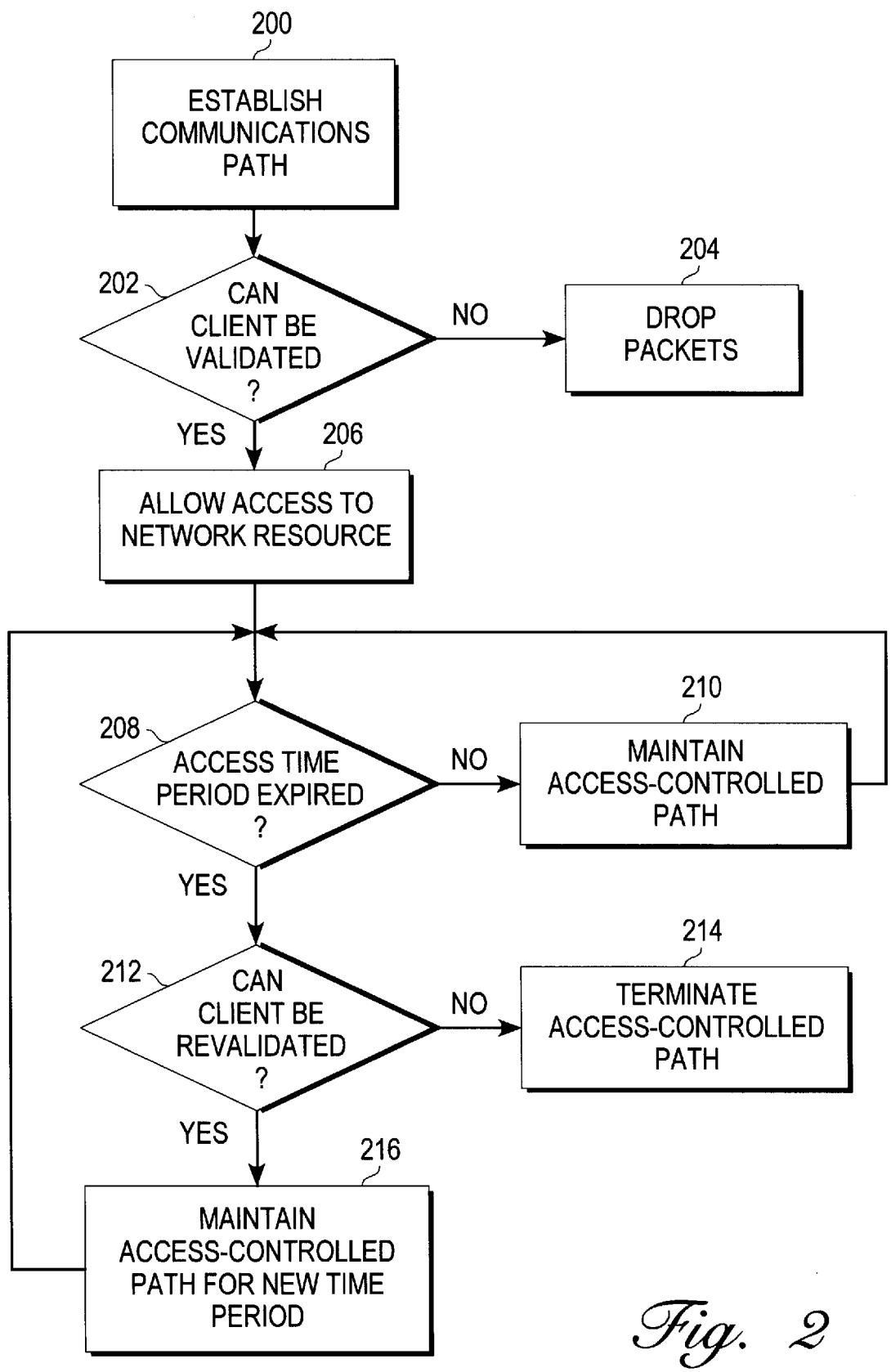
FIG. 2 is a flow chart of a method for establishing an access-controlled communications path.

Referring to FIG. 2, an access-controlled communications path is established between client 20 and a network resource (e.g., server 40) by first establishing a communications path, which may be an unsecured path, across network 10 between client 20 and destination network address 41 (step 200).

Client 20 is validated (step 202) to produce a validated client network address. If validation fails, destination network address 41 can be instructed to drop packets received from the unvalidated network address (step 204). Validation can be accomplished through the use of one-time passwords or with other techniques, as above.

Once client 20 has been validated, access is allowed to a network resource based upon the validated client network address 21 (step 206). This can include configuring the network resource to selectively communicate with validated client network address 21, including selectively accepting packets from validated client network address 21. Once the access-controlled communications path is established, the network resource can also block communication with at least one unvalidated network address (e.g., client network address 31). In other words, when an access-controlled communications path is established, the network resource can choose to only accept packets from the particular IP address which has been validated, thus ensuring that unauthorized clients at other IP addresses are unable to gain access to non-public or confidential information. In some applications, this may include opening firewall 48 to packets from validated client network address 21.

Once established, the access-controlled communications path can be terminated after a first predetermined time period. This can help ensure, among other things, that a remote terminal accidentally left connected will not give an unauthorized client access to non-public information. The time remaining in the first predetermined time period is monitored (step 208), and if it has not yet expired, the access-controlled path is maintained (step 210). During the duration of the first predetermined time period, information can be sent to client 20 to keep client 20 aware of the time limitation. This information can include the time remaining in the period, and can also include information on extending the first predetermined time period. Thus, client 20 can monitor how much time remains before the path will be terminated, and he or she can either finish whatever tasks are being performed or extend the time period before the path is automatically terminated.

When the first predetermined time period expires, the client can be revalidated in order to maintain the access-controlled communications path (step 212). This may also be accomplished at various points within the first predetermined time period. If revalidation is unsuccessful, such as if client 20 has left the remote terminal, the path is terminated (step 214). If revalidation is successful, the access-controlled communications path can be maintained for a second predetermined time period based on the revalidation (step 216). Revalidation can be accomplished by requesting a second predetermined validation sequence from client 20, wherein the access-controlled communications path would be maintained based on the second predetermined validation sequence. The lengths of the various time periods can be configurable for each individual path, or can be a fixed length of time. For example, a particular client may request additional time and, based on the identity of the particular client, a fixed amount of time may be added, the extension of time may be denied, or the client may be allowed to choose how much additional time is granted up to a predetermined maximum.

Once the access-controlled path is terminated, either at the direction of the client 20 or through the expiration of the connection time period, the network resource stops accepting packets from the previously validated client network address until the client network address is again validated. An unauthorized client thereby will not be able to log on through the same terminal (or other IP address) used by the previous authorized client and gain access to privileged information, despite sending messages through the same IP address.

Referring to FIG. 3, software 310 for providing session emulation services can be placed upon any machine-readable device 300, such as a floppy disk, CD-ROM, removable hard drive, or other memory device, and can then be loaded into server 40. Software 310 can include code which, when loaded into server 40, provides the software for establishing a access-controlled communications path between first client 20 and a network resource (e.g., server 40) across network 10 based on the network address associated with first client 20. Software 310 can also include code which, when loaded into a server 40, provides the application software needed to perform validation of first client 20, control the length of time the access-controlled communications path is maintained, and control the disposition of packets received from unvalidated clients.

Establishing an access-controlled communications path allows traveling or other remote clients to access confidential or privileged information over the Internet without compromising the security of the information. For example, a client may log into any terminal with access to the Internet, go to a particular web site, verify his or her authority to access a privileged portion of the web site, and then access the privileged portion without fear of others obtaining information about, or access to, the privileged area. Such a traveling client can generate a challenge table of one-time passwords before traveling and then use those passwords to access the system while away.

The described methods and apparatus provide a low-cost, efficient means of data communication that eliminates the need for clients to carry laptops with them while traveling merely to perform such tasks as using electronic mail, accessing databases, etc. Assuming such a client can access a terminal connected to the Internet, access-controlled communication with a server or other network resource is possible with minimal complexity and no additional hardware.

Clients (such as employees) can access files stored on computers at work while at home merely by accessing the World Wide Web through any Internet Service Provider (ISP). Assuming the employer's computers are connected to the Internet, this can eliminate the need for the company to provide numerous modems to support dial-up capability.

Other embodiments are within the scope of the claims. For example, multiple clients can communicate with each other in a secure environment from any set of Internet-capable terminals. Each client can establish an access-controlled communications path with a particular server or system and then be linked together behind a firewall. Once access-controlled paths are established, secure transmission of messages and data between clients at remote locations can be facilitated without fear of interception.

What is claimed is:

1. A method for establishing an access-controlled communications path between a client and an access-controlled network resource, the client having a client network address associated therewith, said method comprising:

determining whether the client is authorized to access the access-controlled network resource;

in response to a determination that the client is authorized to access the access-controlled network resource, configuring a firewall to selectively accept future communications having the client network address associated therewith;

receiving a communication;

determining whether said communication has the client network address associated therewith; and in response to a determination that said communication has the client network address associated therewith, allowing said communication to pass through the firewall to the access-controlled network resource, thereby establishing an access-controlled communications path between the client and the access-controlled network resource.

2. The method of claim 1, further comprising:

in response to a determination that said communication does not have the client network address associated therewith, preventing said communication from passing through the firewall to the access-controlled network resource.

3. The method of claim 2, wherein said communication comprises one or more packets, and wherein preventing comprises dropping said one or more packets.

4. The method of claim 1, further comprising:

determining whether the access-controlled communications path has been terminated by the client; and in response to a determination that the access-controlled communications path has been terminated by the client, configuring the firewall to no longer accept future communications having the client network address associated therewith.

5. The method of claim 1, further comprising:

maintaining the access-controlled communications path for a predetermined period of time; and upon expiration of said predetermined period of time, configuring the firewall to no longer accept future communications having the client network address associated therewith.

6. The method of claim 1, further comprising:

maintaining the access-controlled communications path for a first predetermined period of time;

determining whether the access-controlled communications path should be further maintained beyond said first predetermined period of time; and in response to a determination that the access-controlled communications path should be further maintained, maintaining the access-controlled communications path for a second predetermined period of time.

7. The method of claim 6, wherein determining whether the access-controlled communications path should be further maintained comprises:

determining whether the client wishes to have the access-controlled communications path further maintained; and in response to a determination that the client wishes to have the access-controlled communications path further maintained, determining whether the client is still authorized to access the access-controlled network resource.

8. The method of claim 7, further comprising:

providing information to the client regarding said first predetermined time period.

9. The method of claim 8, wherein said information regarding said first predetermined time period comprises information on time remaining in said first predetermined time period.

10. The method of claim 9, wherein said information regarding said first predetermined time period further comprises information on how to further maintain the access-controlled communications path.

11. The method of claim 1, wherein determining whether the client is authorized to access the access-controlled network resource comprises:

receiving one or more validation codes from the client; and determining whether said one or more validation codes are valid.

12. The method of claim 11, wherein said one or more validation codes are single use codes.

13. The method of claim 1, wherein a derivative client shares the client network address with the client, wherein the client causes the access-controlled communications path to be established for a first period of time, and the derivative client causes the communications path to be established for a second period of time, the method further comprising:

maintaining the access-controlled communications path until both said first and second periods of time have expired.

14. An apparatus for establishing an access-controlled communications path between a client and an access-controlled network resource, the client having a client network address associated therewith, said apparatus comprising:

a publicly accessible communications port coupled to a network for communicating with the client;

an access-controlled communications port coupled to the access-controlled network resource;

a configurable firewall coupled to said publicly accessible communications port and said access-controlled communications port, said firewall selectively passing communications received from said publicly accessible communications port on to said access-controlled communications port; and a validation system coupled to said publicly accessible communications port and said firewall, said validation system determining whether the client is authorized to access the access-controlled network resource, and in response to a determination that the client is authorized to access the access-controlled resource, said validation system configuring said firewall to cause said firewall to pass future communications having the client network address associated therewith on to said access-controlled communications port, thereby establishing an access-controlled communications path between the client and the access-controlled network resource.

15. The apparatus of claim 14, wherein said firewall prevents communications which do not have the client network address associated therewith from being passed on to said access-controlled communications port.

16. The apparatus of claim 14, further comprising:

a timer coupled to said firewall for maintaining a predetermined time period, and after expiration of said time period, said timer configuring said firewall to cause said firewall to no longer pass communications having the client network address associated therewith on to said access-controlled communications port.

17. A computer readable medium having stored thereon instructions, which when executed by one or more processors, cause the one or more processors to establish an access-controlled communications path between a client and an access-controlled network resource, the client having a client network address associated therewith, said computer readable medium comprising:

instructions for causing one or more processors to determine whether the client is authorized to access the access-controlled network resource;

instructions for causing one or more processors to configure, in response to a determination that the client is authorized to access the access-controlled network resource, a firewall to selectively accept future communications having the client network address associated therewith;

instructions for causing one or more processors to receive a communication;

instructions for causing one or more processors to determine whether said communication has the client network address associated therewith; and instructions for causing one or more processors to allow, in response to a determination that said communication has the client network address associated therewith, said communication to pass through the firewall to the access-controlled network resource, thereby establishing an access-controlled communications path between the client and the access-controlled network resource.

18. The computer readable medium of claim 17, further comprising:

instructions for causing one or more processors to prevent, in response to a determination that said communication does not have the client network address associated therewith, said communication from passing through the firewall to the access-controlled network resource.

19. The computer readable medium of claim 17, further comprising:

instructions for causing one or more processors to determine whether the access-controlled communications path has been terminated by the client; and instructions for causing one or more processors to configure, in response to a determination that the access-controlled communications path has been terminated by the client, the firewall to no longer accept future communications having the client network address associated therewith.

20. The computer readable medium of claim 17, further comprising:

instructions for causing one or more processors to maintain the access-controlled communications path for a predetermined period of time; and instructions for causing one or more processors to configure, upon expiration of said predetermined period of time, the firewall to no longer accept future communications having the client network address associated therewith.

21. The computer readable medium of claim 17, further comprising:

instructions for causing one or more processors to maintain the access-controlled communications path for a first predetermined period of time;

instructions for causing one or more processors to determine whether the access-controlled communications path should be further maintained beyond said first predetermined period of time; and instructions for causing one or more processors to maintain, in response to a determination that the access-controlled communications path should be further maintained, the access-controlled communications path for a second predetermined period of time.

22. The computer readable medium of claim 21, wherein the instructions for causing one or more processors to determine whether the access-controlled communications path should be further maintained comprises:

instructions for causing one or more processors to determine whether the client wishes to have the access-controlled communications path further maintained; and instructions for causing one or more processors to determine, in response to a determination that the client wishes to have the access-controlled communications path further maintained, whether the client is still authorized to access the access-controlled network resource.

23. The computer readable medium of claim 22, further comprising:

instructions for causing one or more processors to provide information to the client regarding said first predetermined time period.

24. The computer readable medium of claim 23, wherein said information regarding said first predetermined time period comprises information on time remaining in said first predetermined time period.

25. The computer readable medium of claim 24, wherein said information regarding said first predetermined time period further comprises information on how to further maintain the access-controlled communications path.

26. The computer readable medium of claim 17, wherein the instructions for causing one or more processors to determine whether the client is authorized to access the access-controlled network resource comprises:
    instructions for causing one or more processors to receive one or more validation codes from the client; and
    instructions for causing one or more processors to determine whether said one or more validation codes are valid.

27. The computer readable medium of claim 26, wherein said one or more validation codes are single use codes.

* * * * *